Dec. 22, 1942.  L. ANTONELLI  2,305,756
STEPPED PROFILE TURNING
Filed March 29, 1940
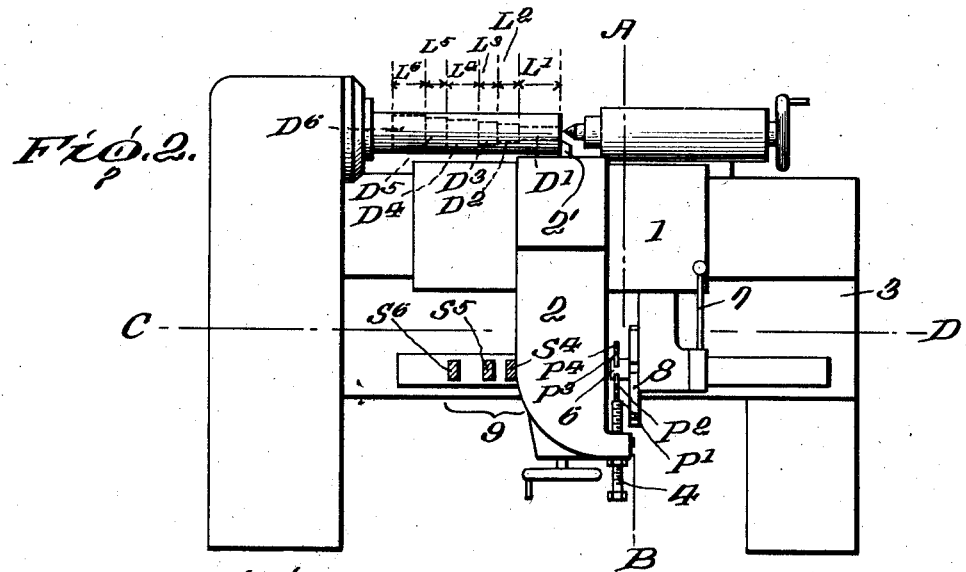
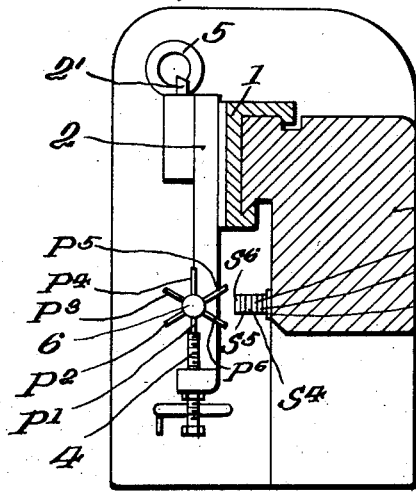
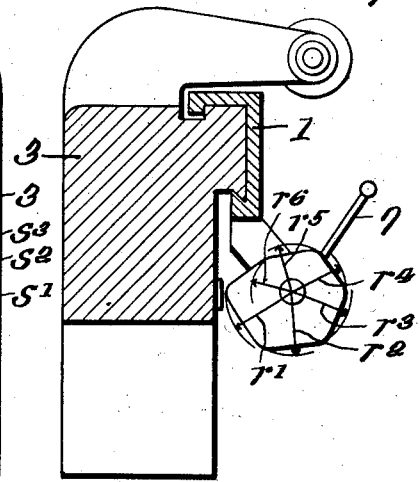
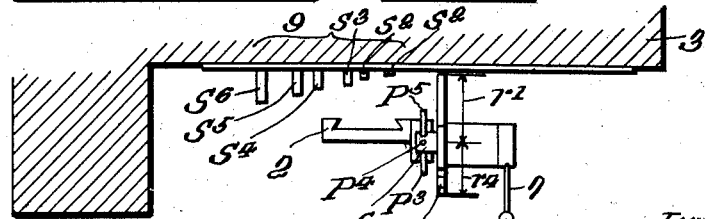
INVENTOR
L. Antonelli
By C. F. Wenderoth
ATTORNEY Patented Dec. 22, 1942

2,305,756

UNITED STATES PATENT OFFICE 2,305,756

STEPPED PROFILE TURNING

Leonida Antonelli, Padova, Italy; vested in the Alien Property Custodian

Application March 29, 1940, Serial No. 326,777
In Italy April 13, 1939

5 Claims. (Cl. 82—11)

Different devices are at present known for controlling a lathe tool so that a work piece is provided with different diameters for different lengths.

In known devices, the two operations of fixing the turning diameter and of fixing the length of cut at this diameter are obtained by two different operations and there is no possibility of coordinating a certain diameter with a certain length of cut so as to exclude the possibility of an error in the lathe operation.

The device forming the object of my present invention aims to control lathe operation so that work pieces having different diameters for different lengths may be produced without any possibility of erroneous execution. The device according to my invention comprises a rotative star of spokes setting the turning diameter as a function of the length of the said spokes by acting on a member connected with the tool, and an adjustable abutment fixed on the said star so as to be rotated together with the star. The outline of said abutment is of such form as to engage during the lengthwise movement of the tool holder with stops placed on the lathe bed having different progressively increasing projections, thus producing the stopping of the lengthwise movement of the tool holder, and determining for each spoke and therefore for each turning diameter the corresponding length of cut.

A device according to the invention is shown by way of example in the accompanying drawing but the invention is not limited to this form of execution.

Fig. 1 shows a vertical section of the lathe on which the device is applied.

Fig. 2 is a front view of the lathe and the device,

Fig. 3 shows a side view along the line section A—B of Fig. 2,

Fig. 4 is a cross sectional view of the device along the section line C—D of Fig. 2.

In the drawing, 1 indicates the chief lathe saddle, bearing the tool holder carriage 2 with the tool 2'. 3 indicates the bed of the lathe on which the lathe saddle 1 is carried. 4 is a shaft of predetermined length connected with the tool 2', so as to obtain displacements of the tool corresponding to the displacement of the shaft. The working piece is shown at 5 on which the different diameters to be cut are indicated at $D_1$, $D_2$, $D_3$, $D_4$, $D_5$, and $D_6$, and the coordinated lengths thereof are indicated at $L_1$, $L_2$, $L_3$, $L_4$, $L_5$, $L_6$. A star 6 has a number of spokes $P_1$—$P_6$ corresponding to the number of different diameters desired and each diameter corresponds to a determined spoke. Since the length of the spokes is different and the spokes act on the shaft 4, their length determines the different displacements of the said shaft and therefore the different displacements of the tool 2'. This produces the various final diameters of the work piece and the reference numbers of the spokes $P_1$, $P_2$, $P_3$, $P_4$, $P_5$, and $P_6$ correspond to the reference numbers of the different diameters $D_1$—$D_6$. The rotation of the star 6 is obtained by the lever 7. The rotary abutment 8 is rotated together with the start 6 by the lever 7 and has outline portions, which correspond to the spokes $P_1$—$P_6$ and therefore also to the turning diameters $D_1$—$D_6$, and these portions have different distances indicated $r_1$, $r_2$, $r_3$, $r_4$, $r_5$, $r_6$ from the centre of rotation of the abutment, the reference numbers indicating their relationship with the spokes $P_1$—$P_6$, with the diameters $D_1$—$D_6$ and with the lengths of cut $L_1$—$L_6$. In the example shown these distances $r_1$—$r_6$ are progressively decreasing. A series of stops 9 is placed on the bed 3 of the lathe and indicated by the references $S_1$, $S_2$, $S_3$, $S_4$, $S_5$, $S_6$, the numbers indicating the relationship with the distances $r_1$—$r_6$ on the abutment 8, with the spokes $P_1$—$P_6$ of the star 6, with the diameters $D_1$—$D_6$ and the lengths $L_1$—$L_6$. These stops 9 have different amounts of projection from a fixed surface of the lathe bed, so that the stop $S_1$ engages with the side of the abutment 8 having the distance $r_1$ from its centre, thus producing the stop of the lathe saddle bearing the tool holder carriage 2 when the tool controlled by the spoke $P_1$ has finished the turning with the diameter $D_1$ for the length $L_1$, and so on for the stops $S_2$, $S_3$, $S_4$, $S_5$, $S_6$.

The drawing shows clearly the operation of the device. The cutting begins with the diameter $P_1$, which is to be maintained for the length $L_1$. Therefore by means of the lever 7 the star 6 of the spokes is rotated so that the spoke $P_1$ bears on the shaft 4, putting by means of this shaft the tool 2' in the position suitable for turning with the diameter $D_1$.

This diameter will be maintained for the length $L_1$ at the end of which the abutment 8 abuts against the stop $S_1$ with the side having the distance $r_1$ from the centre thereof, thus stopping the lengthwise movement of the tool holder 2 and therefore the turning operation of the tool 2' with the diameter $D_1$.

The star 6 will then be turned further by means of the lever 7 in order to put the spoke $P_2$ on the shaft 4 and to bring the tool 2' in working position with the diameter $D_2$ for the length $L_2$ in the same way as it was done before for the diameter $D_1$ and the length $L_1$.

It is easy to understand that in view of the progression of the values of the stops and the corresponding decreasing of the values of $r$ any error in the execution of the working pieces is excluded.

Of course the correspondence between the turning diameters and the lengths of cuts may be obtained also by different means, for example instead of the different projections of the stops these may be placed at a different height and the abutment member may receive a different outline.

There are several advantages for the device. Very important, particularly for the production of turned pieces in series, is the advantage to obtain the stepped profile by turning in the shortest possible time, since with only one rapid movement the diameters and the lengths of turning are simultaneously predetermined.

A further advantage consists in the avoidance of errors in the execution and wastage, as between the diameter and the lengths a sure relation has been created. Besides, the device is of easy and cheap construction and may be rapidly mounted and dismounted on the lathe, this feature being very useful in the case of a multiple use of the lathe as for alternatively producing stepped and nonstepped profiles.

The device may also be realised by rendering adjustable the lengths of the spokes as well as the position of the stops.

In this way it becomes possible to quickly and easily change at will the turning diameters and the corresponding lengths of cut for which the said diameters must be maintained.

What I claim is:

1. A device controlling coordinated diameters and lengths of cut in lathe operation comprising a tool holder, a rotary spoked star mounted on the lathe saddle and having spokes of different lengths cooperating with said tool holder for determining the turning diameter, an abutment member fixed to said star and rotating therewith, said abutment member having abutting stops located at different radial distances from its axis of rotation and a series of stops on the lathe bed cooperating with said abutting stops for determining the length of cut at a determined diameter.

2. A device controlling coordinated diameters and lengths of cut in lathe operation comprising a tool holder, a rotary spoked star mounted on the lathe saddle and having spokes of different lengths cooperating with said tool holder for determining the turning diameter, an abutment member fixed to said star and rotating therewith and a series of stops on the lathe bed cooperating with said abutment member for determining the length of cut at a determined diameter.

3. A device controlling coordinated diameters and lengths of cut in lathe operation comprising a tool holder, a rotary spoked star mounted on the lathe saddle and having spokes of different lengths cooperating with said tool holder for determining the turning diameter, an abutment member fixed to said star and rotating therewith, said abutment member having abutting stops located at different radial distances from its axis of rotation and a series of stops on the lathe bed cooperating with said abutting stops for determining the length of cut at a determined diameter, said series of stops comprising stops of different projecting length on said lathe bed.

4. A device controlling coordinated diameters and lengths of cut in lathe operation comprising a tool holder, a rotary spoked star mounted on the lathe saddle and having spokes of different lengths cooperating with said tool holder for determining the turning diameter, an abutment member fixed to said star and rotating therewith, said abutment member having abutting stops located at different radial distances from its axis of rotation and a series of stops on the lathe bed cooperating with said abutting stops for determining the length of cut at a determined diameter, said spokes being of adjustable length.

5. A device controlling coordinated diameters and lengths of cut in lathe operation comprising a tool holder, a rotary spoked star mounted on the lathe saddle and having spokes of different lengths cooperating with said tool holder for determining the turning diameter, an abutment member fixed to said star and rotating therewith and a series of adjustable stops on the lathe bed cooperating with said abutment member for determining the length of cut at a determined diameter.

LEONIDA ANTONELLI.